United States Patent [19]

Dalke et al.

[11] 3,944,993

[45] Mar. 16, 1976

[54] NON-INTERLACED 263 TV LINE CHARACTER GENERATION SYSTEM

[75] Inventors: James A. Dalke, Bellevue; Wayne E. Hough, Seattle, both of Wash.

[73] Assignee: Metro Data Corporation, Seattle, Wash.

[22] Filed: Sept. 14, 1973

[21] Appl. No.: 397,287

[52] U.S. Cl. .................... 340/324 AD; 178/DIG. 13

[51] Int. Cl.[2] ............................................ G06F 3/14

[58] Field of Search ...... 340/324 AD; 178/69.5 TV, 178/69.5 G, DIG. 13; 315/31

[56] References Cited

UNITED STATES PATENTS

| | | | |
|---|---|---|---|
| 3,624,281 | 11/1971 | Phan | 178/69.5 G |
| 3,624,634 | 11/1971 | Clark | 340/324 AD |
| 3,737,568 | 6/1973 | Camras | 178/69.5 TV |
| 3,751,588 | 8/1973 | Eckenbrecht et al. | 178/69.5 TV |
| 3,806,637 | 4/1974 | Sideris | 178/69.5 TV |

*Primary Examiner*—Marshall M. Curtis

*Attorney, Agent, or Firm*—Christensen, O'Connor, Garrison & Havelka

[57] ABSTRACT

A character generator system suitable for creating a character display on the screen of a standard TV receiver is disclosed. The character generator system includes a sync generator which generates timing and synchronizing signals that create a 263 line, non-interlaced, roster. The character generator system also includes a character generator adapted to receive binary signals that define the character display. The character generator is timed and synchronized by the sync generator so as to create a charater video signal suitable for creating the character display as the screen of the TV receiver is scanned. Color is added to the character video signal by a chroma generator in a manner such that the background is in one color and characters are in another color. The 263 line raster (non-interlaced) results in a color display without color fringing.

4 Claims, 15 Drawing Figures

NON-INTERLACED 263 TV LINE CHARACTER GENERATION SYSTEM

BACKGROUND OF THE INVENTION

This invention is directed to character generation systems and more particularly to character generation systems for creating a character display on a TV receiver.

One of the problems with some prior art character generator systems is that they will not create characters on the screen of a standard residential TV receiver without substantial modifications being made to the receiver. Thus, they use expensive special receivers for character display. Another problem with prior art color character generator systems, is the undesirable color fringing effect which occurs when a standard interlaced 262 ½ dual field technique is used. This invention is directed to overcoming these and other problems related to prior art character generator systems, particularly those which display characters in color.

More specifically, in setting standards for broadcast color television, special consideration was given to the method of coding the color values and combining it with the monochrome information in a compatible and bandwidth conserving manner. The standards for accomplishing this have been set forth by the NTSC and approved by the FCC.

The general principle utilizes a low visibility subcarrier for transmission of the chrominance information. In effect a system was developed which would introduce a subcarrier, the frequency of which would be an odd harmonic of over half the line scanning frequency. The result is to distribute the energy in the frequency spectrum in areas where substantially no energy normally exists, halfway between the line frequency harmonics.

By using the odd harmonics of ½ the line frequency, the subcarrier on line 526 (line 1 of the successive frame) will be 180 degrees out of phase, relative to the previous frame of line 1. This reversal results in low visibility because of the physiological integration of the eyes of the viewer.

One problem that results from the use of this subcarrier relationship is an apparent upward crawl of the odd harmonic, one half the line, frequency pattern. This dot crawl is particularly visible in synthetically generated color pictures such as computer generated graphics and alphanumeric character generators.

A solution to the upward edge crawl can be obtained by changing the number of lines per frame from the standard 525 lines to 526. This results in a very small change in the vertical rate, but not enough to affect most standard color receivers.

This also results in a non-interlaced picture because each successive field now becomes overlayed, line-for-line with the preceding one. Now only half the number of lines appear on the raster as normal. In the case of computer generated graphics, however, often the second field is redundant with the first, and as a result, no loss of resolution occurs. In fact, with computer generated graphics, the appearance is subjectively improved by the use of non-interlaced sync. One of the requirements for these results is that the horizontal frequency be an odd harmonic of the vertical frequency. This results in a 180° phase reversal of the subcarrier, not only from line to line, but now from field to field, resulting in complete invisibility of the subcarrier components in a stationary picture.

Since the number of lines per field must be an odd number, and to maintain compatibility with NTSC standards, 263 lines per field is chosen by this invention as the closest odd number to the standard 262-½ lines.

It is an object of this invention to provide a character generator system.

It is also an object of this invention to provide a character generation system for creating the character display on a TV receiver.

It is a further object of this invention to provide a character generation system suitable for creating a non-interlaced character display on a standard residential TV receiver.

It is a still further object of this invention to provide a character generation system for creating a non-interlaced character display in color on a residential TV receiver.

BRIEF DESCRIPTION OF THE DRAWINGS

The foregoing objects and many of the attendant advantages of this invention will become more readily understood by reference to the following detailed description when taken in conjunction with the accompanying drawings wherein.

DESCRIPTION OF THE PREFERRED EMBODIMENT

Prior to describing a preferred embodiment of the invention, reference is hereby made to U.S. Pat. application Ser. No. 397,288 filed concurrently herewith (Sept. 14, 1973) and entitled MULTIPLE CHANNEL TELEVISION DISPLAY SYSTEM. That application descirbes a character display system wherein the invention described herein is useful and the information contained in that application is hereby incorporated herein by reference.

Figure 1:
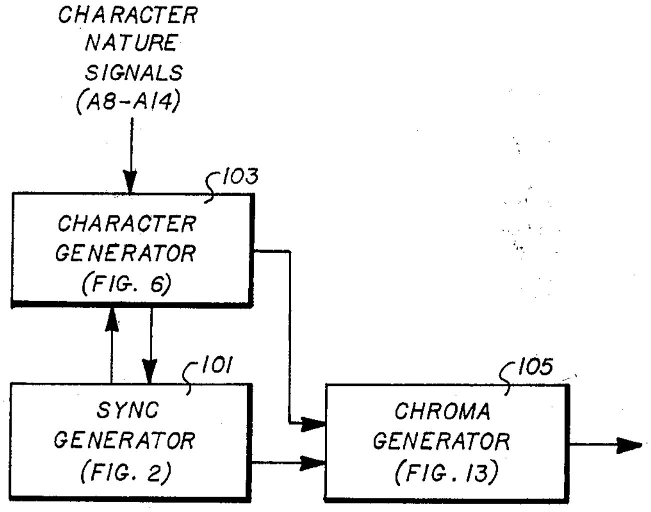
FIG. 1 is a block diagram of a preferred embodiment of the invention.

Turning now to a preferred embodiment of the invention, FIG. 1 illustrates a preferred embodiment of the invention and comprises: a sync generator 101; a character generator 103; and, a chroma generator 105. The sync generator generates synchronizing or timing signals which define in binary terms the dots located on the screen of a TV picture tube along a 263 TV line display. These and other timing signals generated by the sync generator control the creation of the character display. The character generator receives binary signals designated A8–A14, which may be generated in the manner described in the patent application referenced above. These binary signals define the nature of characters to be displayed. The character generator creates a character video signal ($\overline{CHV}$) which includes information necessary to form the characters as a TV picture tube is scanned. The chroma generator receives the $\overline{CHV}$ signal and adds color information to it.

SYNC GENERATOR

In general, the sync generator is adapted to generate synchronizing signals for use by the character generator and the chroma generator.

Figure 2:
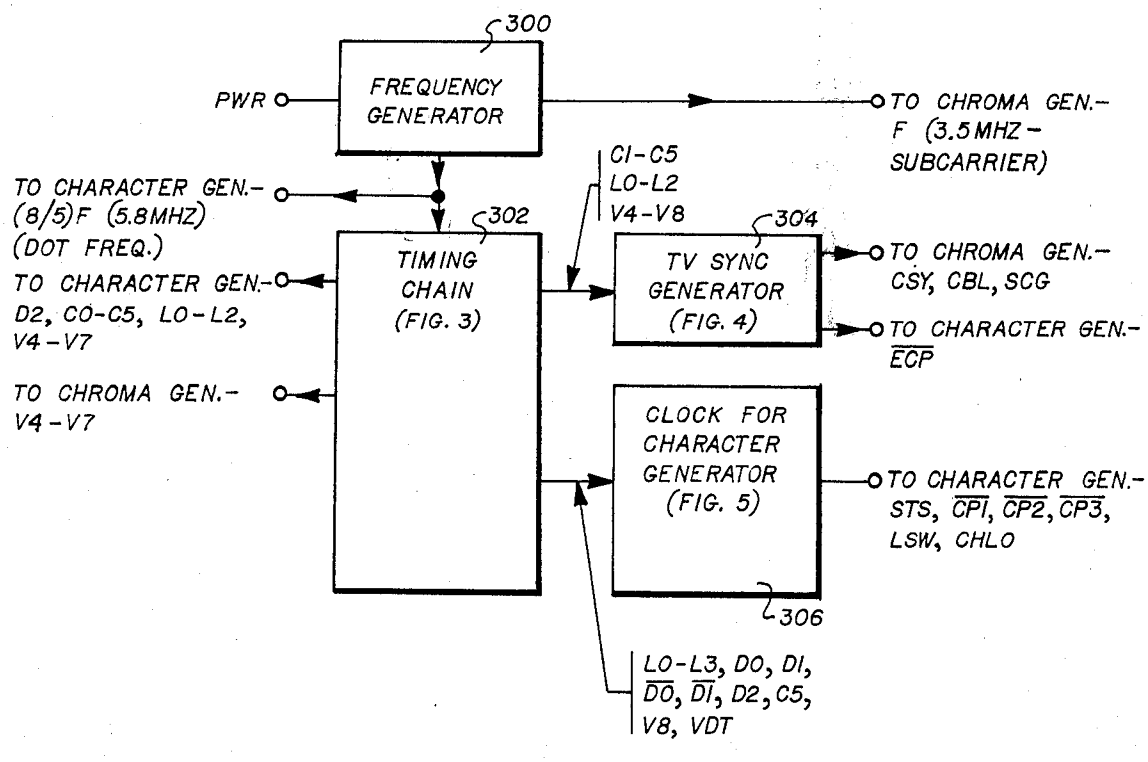
FIG. 2 is a block diagram of a sync generator suitable for use in the embodiment of the invention illustrated in FIG. 1.

FIG. 2 is a block diagram illustrating a sync generator suitable for use by the preferred embodiment of the invention illustrated in FIG. 1 and comprises a frequency generator 300; a timing chain 302; a TV sync generator 304; and a clock for character generator 306.

The frequency generator is powered from a suitable source and generates a 3.5MHz subcarrier signal designated F which is applied to the chroma generator. In addition, the frequency generator generates an (8/5) F (5.8MHz) signal which is applied to the character generator and to the timing chain 302 of the sync generator. The frequency generator may be a phase locked loop or any other suitable type of frequency source adapted to generate the desired signals.

The timing chain generates a plurality of signals which are applied to the character generator and the chroma generator. In addition, the timing chain applies timing signals to the TV sync generator 304 and to the clock for character generator 306. The TV sync generator generates chroma control signals (CSY, CBL and SCG) which are applied to the chroma generator and an $\overline{ECP}$ enabling signal which is applied to the character generator. The clock for character generator generates clock pulses which are applied to the character generator.

In accordance with the preferred embodiment of the invention, the maximum possible number of rows of characters that can be displayed on a TV screen are sixteen. Each of the sixteen possible rows includes twelve TV lines. Of the twelve lines, seven are utilized for character display and the remaining five are utilized to provide space between the rows of characters. In each row, there is a potential 52 character positions from one side of the screen to the other side. However, in accordance with the preferred embodiment of the invention only 32 of the 52 possible positions are used in an actual display. In each character position, there are seven horizontal dot positions in each of the 12 lines (seven being used for character display). Of these seven positions, only five are used to provide a character display. The other two dot positions provide spaces between characters. In addition, the invention utilizes a unique single 263-line TV raster, rather than two interlaced fields of 262-½ lines each, as is common in standard commercial television broadcast systems. However, this scanning technique will operate a conventional TV receiver without modification because suitable synchronizing information is included with the display information ultimately transmitted on the various channels of an overall multiple channel television display system formed in accordance with the invention. The 263 line TV raster, when the receiver display is in color has been found to eliminate color fringing problems associated with conventional 262 ½ interlaced field systems.

Figure 3:
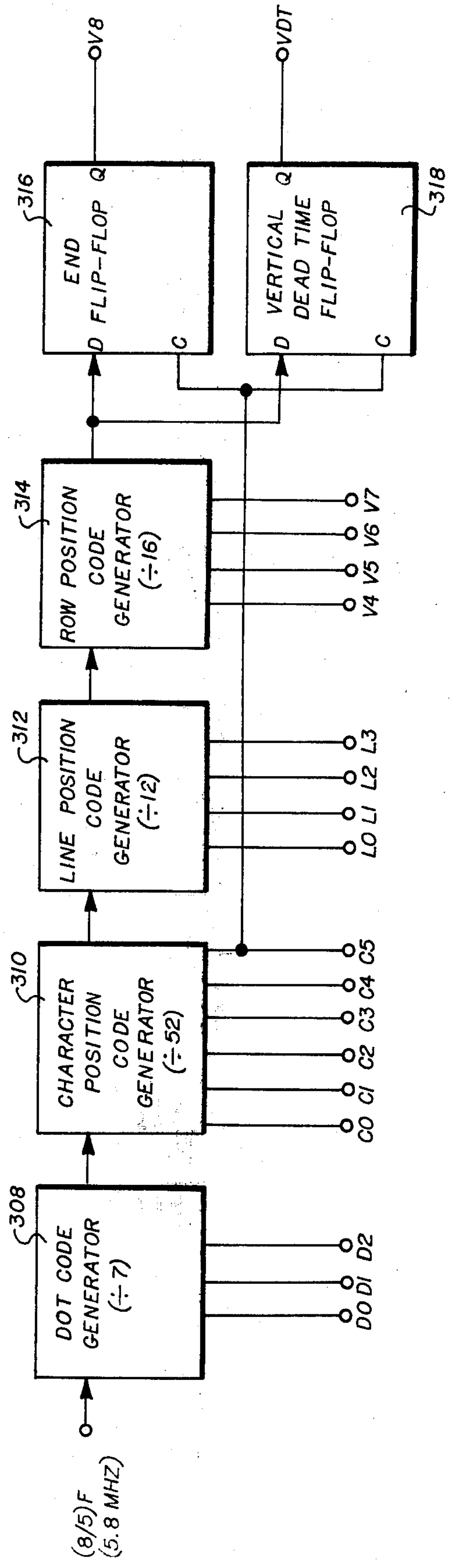
FIG. 3 is a block diagram of a timing chain suitable for use in the sync generator illustrated in FIG. 2.

A timing chain suitable for use in the sync generator illustrated in FIG. 2 is illustrated in FIG. 3. The timing chain illustrated in FIG. 3 comprises a dot code generator 308; a character position code generator 310; a line position code generator 312; a row position code generator 314; and end flip-flop 316; and a vertical dead time flip-flop 318.

Basically, the dot code generator, the character position code generator, the line position code generator and the row position code generator form a dividing chain adapted to divide the (8/5) F signal generated by the frequency generator into timing signals suitable for creating the display previously described. The dot code generator 308 is a divide-by-seven counter adapted to generate signals designated D0, D1 and D2. The coding of these signals designates such position of the seven positions of a particular dot portion of a line of a row of characters. That is, as previously described, each character position along a TV line is defined by seven dot positions. The D0, D1 amd D2 outputs in a binary manner define each of the seven positions.

Each time the dot code generator cycles it sends a pulse to the character position code generator 310. The character position code generator is a divide-by-fifty-two counter which divides each TV line (including retrace) into 52 character positions. As previously indicated, only 32 of these positions are actually used for a character display, the other positions being located on either side of the actual characters being displayed or in retrace. The outputs of the character position code generator are designated C0–C5. The binary code on these outputs uniquely identifies each of the 52 character positions.

The character position code generator generates a pulse once each TV line and applies the pulse to the line position code generator 312. The line position code generator is a divide-by-twelve counter whose outputs define in a binary manner the twelve lines making up each row of characters. The outputs from the line position code generator are designated L0, L1, L2 and L3.

Once each cycle the line position code generator applies a pulse to the row position code generator 314. The row position code generator is a divide-by-sixteen counter whose binary outputs define the sixteen lines of the character display. These outputs are designated V4, V5, V6 and V7. The output of the last stage of the row position code generator is connected to the D input of the end flip-flop 316 and to the D input of the vertical dead time flip-flop 318. C5 is applied to the C inputs of both of these flip-flops. Thus, once each "frame" the end and vertical dead time flip-flops are triggered with a one on their inputs. The output from the end flip-flop 316 is designated V8 and the output from the vertical dead time flip-flop 318 is designated VDT. V8 lasts from the first TV line of row 17 to the eleventh line of the twenty-second row (line 263 of the scan) and is used to reset the timing chain for the next frame which is the same as the first frame (i.e., no "interlacing" occurs --). V8 is also used to perform other functions as hereinafter described.

Figure 4:
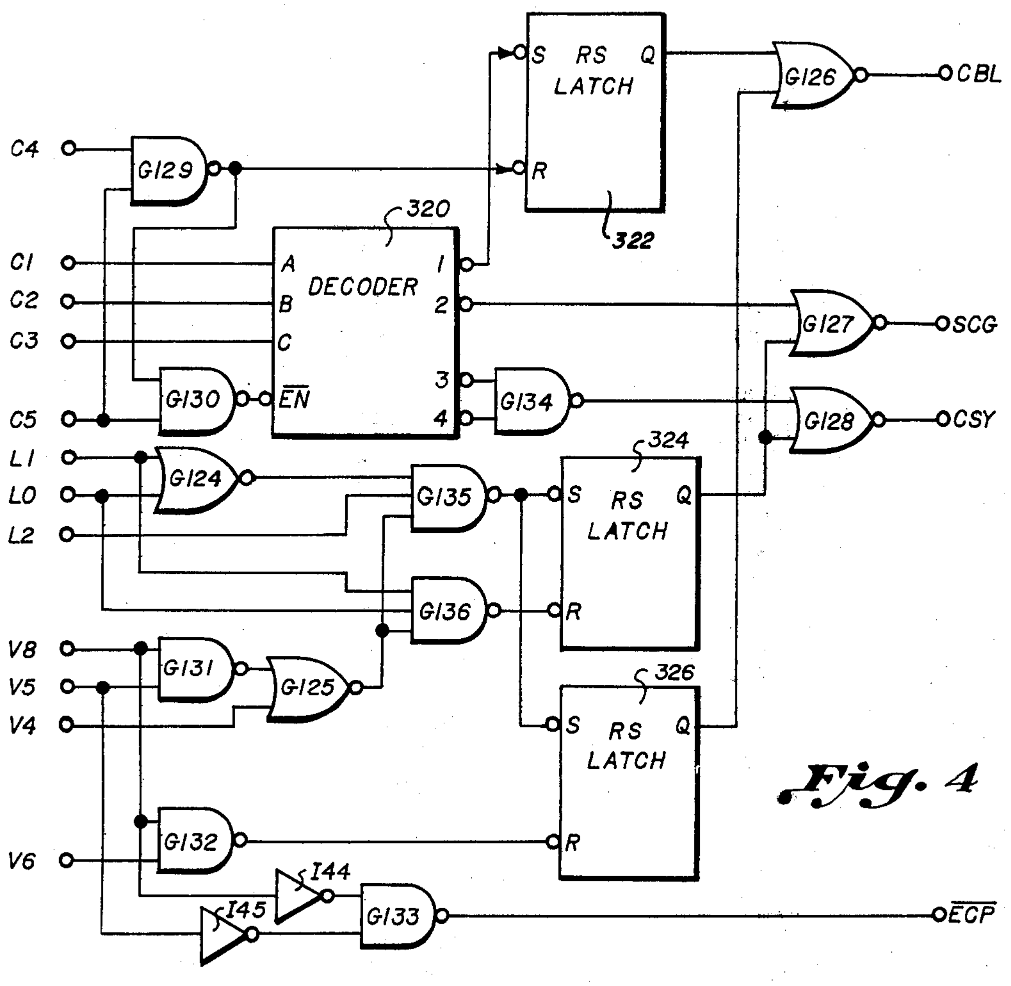
FIG. 4 is a block diagram of a TV sync generator for use in the sync generator illustrated in FIG. 2.

FIG. 4 is a block diagram of a TV sync generator suitable for use by the sync generator illustrated in FIG. 2. The TV sync generator illustrated in FIG. 4 comprises: a decoder 320; three RS latches 322, 324 and 326; five two-input NOR gates designated G124–G128; six two-input NAND gates designated G129–G134; two three-input NAND gates designated G135 and G136; and, two inverters designated I44 and I45.

C4 is applied to one input of G129. C1, C2 and C3 are applied to the signal inputs A, B and C of the decoder 320. C5 is applied to the second input of G129 and to one input of G130. The output of G129 is connected to the R input of the first RS latch 322. The output of G129 is also connected to the second input of G130. The output of G130 is connected to the enable input of the decoder 320. Thus, when C4 and C5 are in appropriate states (C4-zero, C5-one or vice versa) the decoder 320 is enabled to "read" the C1, C2 and C3 signals. These signals are decoded and create binary signals on four outputs (1, 2, 3 and 4). The first output (1) of the decoder is connected to the S input of the first RS latch 322. The second output (2) of the decoder 320 is connected to one input of G127. The other two outputs (3 and 4) of the decoder are connected to the two inputs of G134, respectively. The output of G134 is connected to one input of G128. The Q output of the first RS latch 322 is connected to one input of G126.

L0 and L1 are applied to the two inputs of G124 and two of the inputs of G136. L2 is applied to one input of G135. The output of G124 is connected to a second input of G135. V4 is applied to one input of G125. V5 is applied to one input of G131, and through I45 to one input of G133. V6 is applied to one input of G132. V8 is applied to one input of G131, the second input of G132 and through I44 to the second input of G133.

The output of G131 is connected to the second input of G125. The output of G125 is connected to the third inputs of G135 and G136, respectively. The output of G135 is connected to the S input of the second RS latch 324 and to the S input of the third RS latch 326. The output of G136 is connected to the R input of the second RS latch 324. The output of G132 is connected to the R input of the third RS latch 326. The Q output of the second RS latch is connected to the second inputs of G127 and G128, respectively. The Q output of the third RS latch 326 is connected to the second input of G126.

The output of G126 is a signal designated CBL which stands for composite blanking. The signal occurs at predetermined intervals, determined by the nature of its input signals, to cause blanking of the screen of the TV display. Without going into the matter in detail, because the logic is apparent from the FIG. 4, CBL achieves a one state when characters are not to be displayed, i.e., around the edges of the sixteen line display, between the characters, and between the rows.

The output from G127 is a signal designated SCG and is utilized by the character generator hereinafter described. This signal is a subcarrier burst gate signal. The output of G128 is a signal designated CSY and provides composite sync. CSY is inserted into the resultant video signal in the manner hereinafter described. The output of G133 is a signal designated $\overline{\text{ECP}}$.

$\overline{\text{ECP}}$ is applied to the character generator to enable a comparator in the manner hereinafter described.

Figure 5:
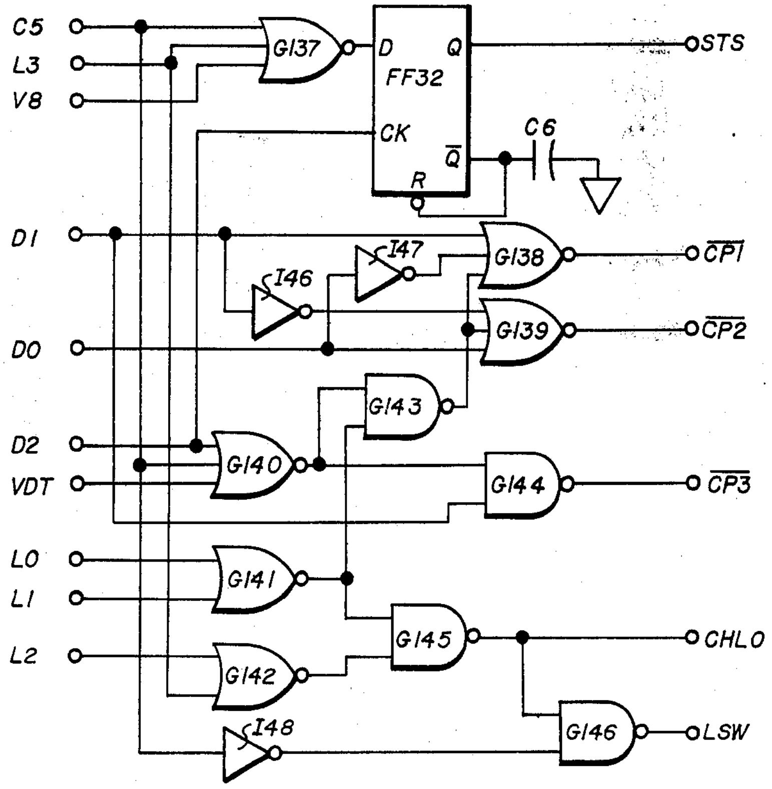
FIG. 5 is a block diagram of a clock for character generator suitable for use in the sync generator illustrated in FIG. 2.

FIG. 5 is a block diagram of a clock for character generator suitable for use in a sync generator illustrated in FIG. 43. In essence, the clock for character generator in reality is a decoder which decodes the pulses generated by the timing chain in a manner such that clock and other instruction pulses are generated for use by the character generator at appropriate times and in appropriate sequences.

The clock for character generator illustrated in FIG. 5 comprises: a D flip-flp designated FF32; four three-input NOR gates designated G137 – G140; two two-input NOR gates designated G141 and G142; four two-input NAND gates designated G143 – G146; and, three inverters designated I46, I47 and I48. C5, L3 and V8 are applied to the three inputs of G137. The output of G137 is connected to the D input of FF32. D2 is applied to the C input of FF32. The Q output of FF32 is designated STS (strobe) and is connected to the hereinafter described character generator. The $\overline{\text{Q}}$ output of FF32 is connected to the reset input of FF32, but is delayed from applying a reset pulse to FF32 by virtue of a capacitor C6 connected between $\overline{\text{Q}}$ and ground.

D1 is applied to one input of G138 aand through I46 to one input of G139. D0 is applied to the second input of G139 and through I47 to the second input of G138. C5, D2 and VDT are applied to the three inputs of G140. The output of G140 is connected to one input of G143 and to one input of G144. D1 is applied to the second input of G144. L0 and L1 are applied to the two inputs of G141. The output of G141 is connected to the second input of G143 and to one input of G145.

L2 and L3 are applied to the two inputs of G142. The output of G142 is connected to the second input of G145. The output of G145 is designated CHL0 (Character line zero) and is connected to one input of G146. C5 is applied to the second input of G146, through I48. The output of G146 is designated LSW. The output of G138 is designated $\overline{\text{CP1}}$, the output of G139 is designated $\overline{\text{CP2}}$ and the output of G144 is designated $\overline{\text{CP3}}$.

As previously indicated, all of the outputs of the clock for the character generator illustrated in FIG. 5 are applied to the character generator as hereinafter described. In general, these signals provide timing for the character generator so that it will operate in the hereinafter described manner.

CHARACTER GENERATOR

Figure 6:
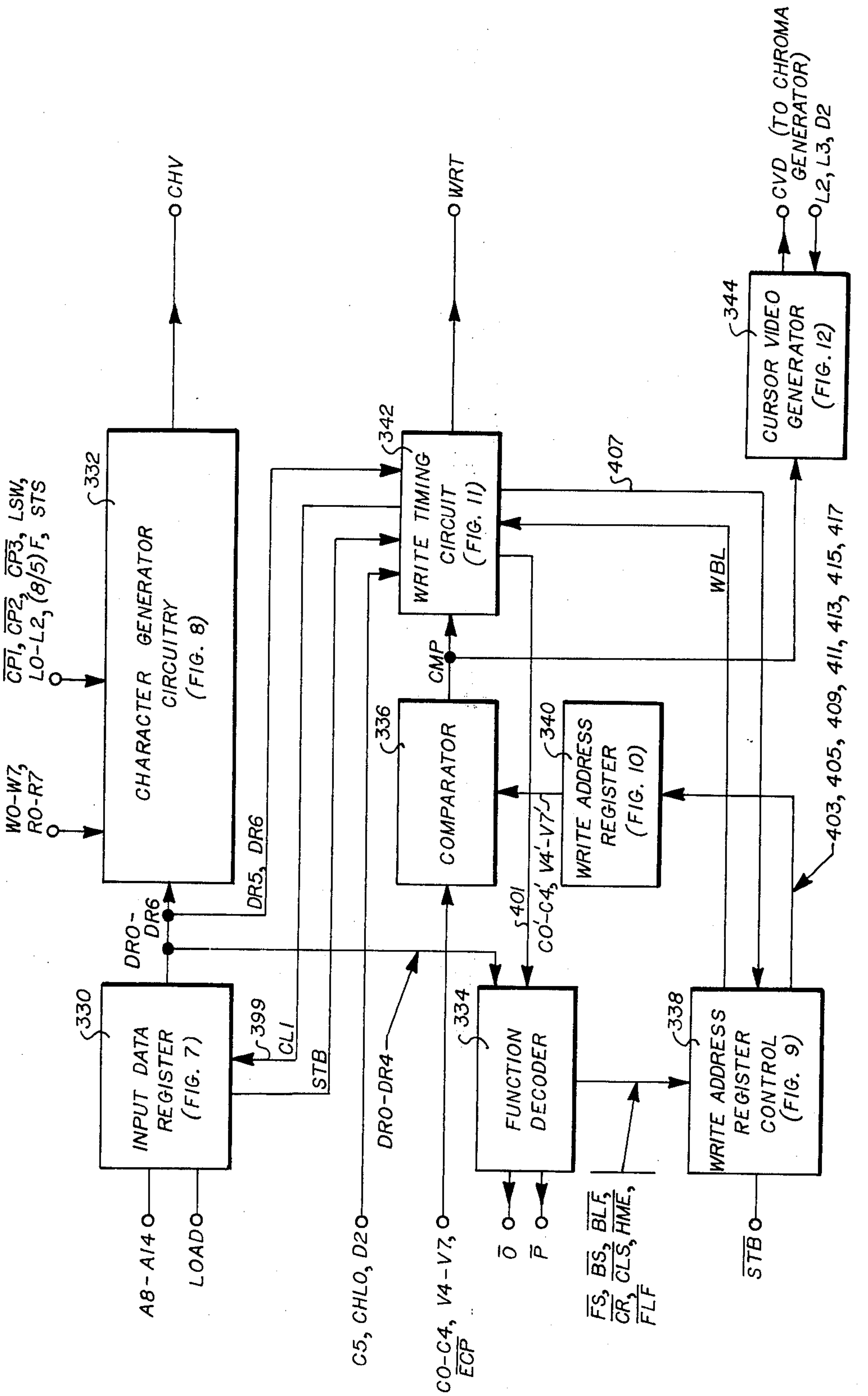
FIG. 6 is a block diagram of a character generator suitable for use in the embodiment of the invention illustrated in FIG. 1.

FIG. 6 is a block diagram of a character generator suitable for use in the preferred embodiment of the invention illustrated in FIG. 1. In general, the character generator receives timing and display instruction from the indicated sources and, in accordance with those instructions, controls the generation of characters to be displayed by a TV receiver. In other words, the character generator, in essence, generates signals which, when received by a standard TV receiver, create a character display. These signals, like any other standard TV signals include information regarding the positioning of characters and the color of the characters (and background) as the TV screen is scanned in a standard manner. That is, as scanning occurs, the guns of the picture tube emit electron beams whose intensity is controlled so that the end result is that a colored character display is provided, without color.

The character generator illustrated in FIG. 6 comprises: an input data register 330; character generator circuitry 332; a function decoder 334; a comparator 336; a write address register 340; a write timing circuit 342; and a cursor video generator 344. The input data register 330 receives instructions A8-A14 and food, as described in the patent application referenced above and incorporated herein by reference, which identify the particular characters to be displayed. This character identification information is sequentially applied to the character generator circuitry 332 wherein it is stored and utilized to create television signals designated CHV (character video) which control the intensity of the electron beam(s) at each point on the face of the TV picture as the beam(s) scan the picture tube face.

In addition, the instructions related to the nature of the characters to be displayed are decoded by a function decoder whose output is utilized to control the write address register control 338. In addition, the function decoder generates two signals, $\overline{O}$ and $\overline{P}$, that indicate whether or not the input data register is receiving new instructions. These signals are used by logic described in the referenced patent application to control the writing of new instructions into the character generator circuitry via control signals W0–W7 and R0–R7.

The write address register control controls the write address register whose output is compared in the comparator with certain outputs from the sync generator related to the "position" of the electron beam. Assuming suitable comparisons are found, the output from the comparator controls the write timing circuit 342 which generates a WRT signal used by logic described in the referenced patent application to enable "writing" into the character generator circuitry.

In this manner synchronization between beam position and character position is achieved. The cursor video generator, in accordance with the output from the comparator, provides a cursor to indicate character position.

Figure 7:
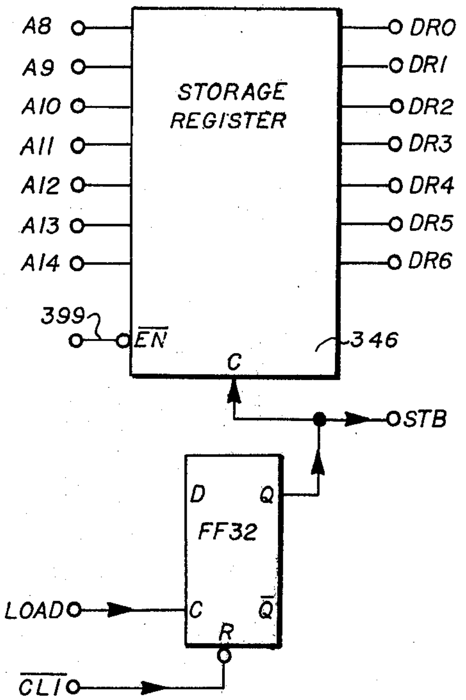
FIG. 7 is a block diagram of an input data register suitable for use in the character generator illustrated in FIG. 6.

FIG. 7 is a block diagram illustrating an input data register suitable for use in the character generator illustrated in FIG. 6. The input data register illustrated in FIG. 7 comprises a storage register 346; and a D flip-flop designated FF32. Signals A8 – A14 are applied to the seven inputs of the storage register 346. A conductor designated 399 from the write timing circuit 342 is connected to the enable input of the storage register. LOAD is applied to the C input of FF32. LOAD is a signal used to inform the input data register that it is enabled to receive the A8 – A14 signals and is generated in any suitable manner such as described in the referenced application. When FF32 is clocked by a LOAD one pulse, it is set. FF32 is reset by $\overline{CL1}$. The Q output of FF32 is designated STB and is connected to the clock (C) input of the storage register 346.

The seven outputs of the storage register are designated DR0 – DR6. DR0 – DR5 are applied to the character generator circuitry 332. DR0 – DR4 are applied to the function code generator 334 and DR6 and DR5 are applied to the write timing circuit 342. In operation, the storage register 346 merely stores the character information on conductors A8 – A14 which information, in addition to character information per se also includes control function information such as spacing (forward and back), line spacing (up and down), etc., in a form suitable for decoding by the function code generator. In addition, DR5 and DR6 include timing information suitable for use by the write timing circuit.

Figure 8:
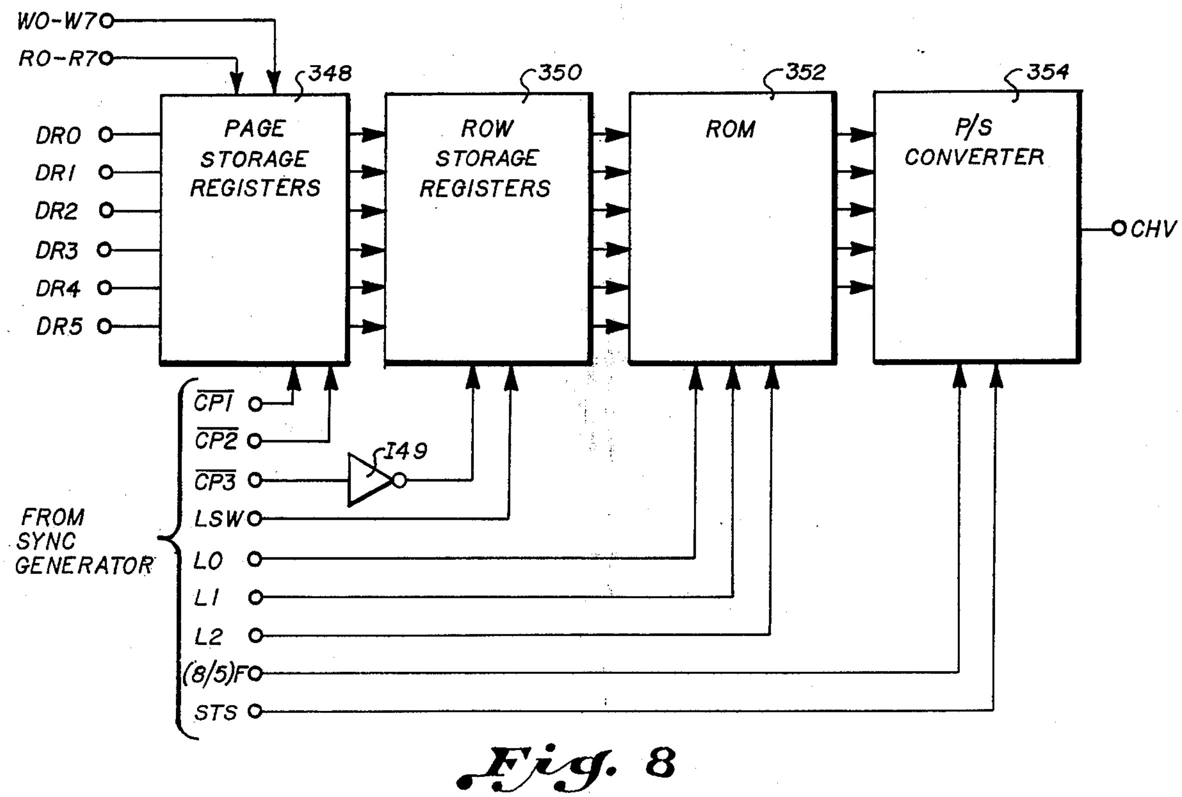
FIG. 8 is a block diagram of character generator circuitry suitable for use in the character generator illustrated in FIG. 6.

Character generator circuitry suitable for use by the character generator illustrated in FIG. 6 is illustrated in FIG. 8 and comprises page storage registers 348; row storage registers 350; a read-only memory 352; and a parallel-to-serial converter 354. In addition, an inverter designated I49 is included in the character generator circuitry.

The page storage register is, preferably, made up of eight sets of six, 512 bit recirculating shift registers. These registers, each of which represent a page, i.e., a complete display of information, are under the control of W0 – W7 and R0 – R7 instructions generated by the suitable logic circuits such as those described in the referenced patent application. On the other hand if only a single page of information is to be illustrated then only one set of six, 512 bit recirculating shift registers may be included, as desired. In any event, the capacity of one set of registers is adequate to store all the information necessary to display a complete page of information. The six outputs of each of the six, 512 bit recirculating shift registers are connected to the inputs of the row storage registers 350 on a one-by-one basis. That is, one output of each of the 512 bit storage registers is connected to one input of the row storage registers. The R0–R7 signals determine at any particular period of time which of the sets of six, 512 bit recirculating shift registers is applying signals to the row storage registers.

The row storage registers is made up of six, 32 bit shift registers. Thus, the row storage registers have the capacity to store instructions adequate to define a row of characters.

The six outputs of the row storage registers 350 are connected to the six inputs of the read-only memory 352. In accordance with the binary code on the outputs of the row storage registers at any particular period of time, the read-only memory generates five binary output signals which are applied to the parallel-to-series converter 354. These signals define, in parallel form, the nature of the characters. That is, these signals control the emissions from the electron guns of the receiving television sets, as their--screens are swept. Thus, these signals control the nature of the display.

The parallel-to-series converter converts its input signals into serial pulse signals to form a signal designated CHV. Thus, CHV signal contains all of the intensity information necessary to create a character display on the TV receivers.

The page storage registers 348 are clocked by the $\overline{CP1}$ and $\overline{CP2}$ pulses generated by the clock for character generator forming part of the sync generator illustrated in FIG. 43. The $\overline{CP3}$ signal through I49 clocks the row storage registers 350. LSW controls loading of the row storage registers 350. The L0, L1 and L2 signals are applied to the read-only memory 352 to define each TV line so that the ROM generates signals related to the character for the particular line that will be swept by the TV scan. The parallel-to-serial converter is enabled by the STS signal generated by the clock for character generator forming a portion of the sync generator. And, the parallel-to-serial converter is clocked by the (8/5) F signal output from the frequency generator portion of the sync generator. (8/5) F is, of course, the dot frequency rate.

As previously indicated, the function decoder decodes the DR0–DR4 outputs from the input data register as they occur to determine certain information. More specifically, the function decoder decodes these outputs into seven signals designated $\overline{FS}$ (forward space), $\overline{BS}$ (back space), $\overline{BLF}$ (back line feed), $\overline{CR}$ (carriage return), $\overline{CLS}$ (clear screen), $\overline{HME}$ (home), and $\overline{FLF}$ (forward line feed). These signals, obviously, relate to certain functions generated by a keyboard or by a newsline teletype or the like. Thus, these signals in essence contain information about the nature of the character display. These signals are applied to the write address register control which, in accordance therewith, controls the write address register.

Figure 9:
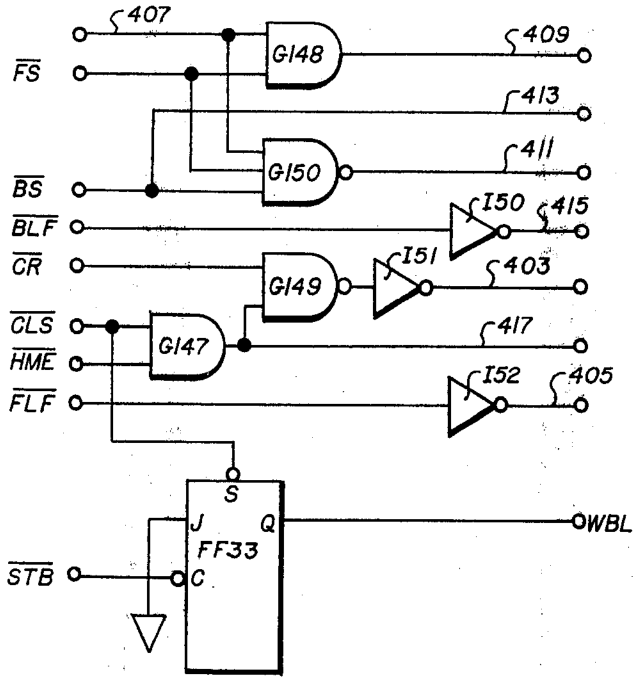
FIG. 9 is a block diagram of a write address register control suitable for use in the character generator illustrated in FIG. 6.

A write address register control suitable for use in the character generator illustrated in FIG. 6 is illustrated in FIG. 9 and comprises: two two-input AND gates designated G147 and G148; one three-input NAND gate designated G150; one two-input NAND gate designated G149; three inverters designated I50, I51 and I52; and, a JK flip-flop designated FF33. A conductor designated 407, from the write timing circuit hereinafter described, is connected to one input of G148 and one input of G150. $\overline{FS}$ is applied to the second input of G148 and the second input of G150. The output of G148 is applied to a conductor designated 409. $\overline{BS}$ is applied to the third input of G150 and to a conductor designated 413. The output of G150 is applied to a conductor designated 411. $\overline{BLF}$ is applied through I50 to a conductor designated 415. $\overline{CR}$ is applied to one input of G149.

$\overline{CLS}$ is applied to one input of G147 and to the S terminal of FF33. $\overline{HME}$ is applied to the second input of G147. The output of G147 is connected to a conductor designated 417 and to the second input of G149. The output of G149 is connected through I51 to a conductor designated 403. $\overline{FLF}$ is applied through I52 to a conductor designated 405. The J input of FF33 is connected to ground. $\overline{STB}$, which is the inverted output of FF32 of the input data register, is applied to the C input of FF33. The Q output of FF33 is a signal designated WBL (write blank page). When this signal occurs, a blanking of the screen of the TV receiver occurs.

In general, the write address register control decodes the various outputs from the function decoder so that these outputs can be used to control counters making up the write address register hereinafter described. That is, the write address register is formed of two up-down counters and associated logic, as will be better understood from the following description. These counters and the logic are preset, and pulsed up and down by the signals on the conductors 403, 405, 409, 411, 413, 415 and 417 to create character position signals that correspond to C0–C4 and V4–V7 for comparison purposes.

Figure 10:
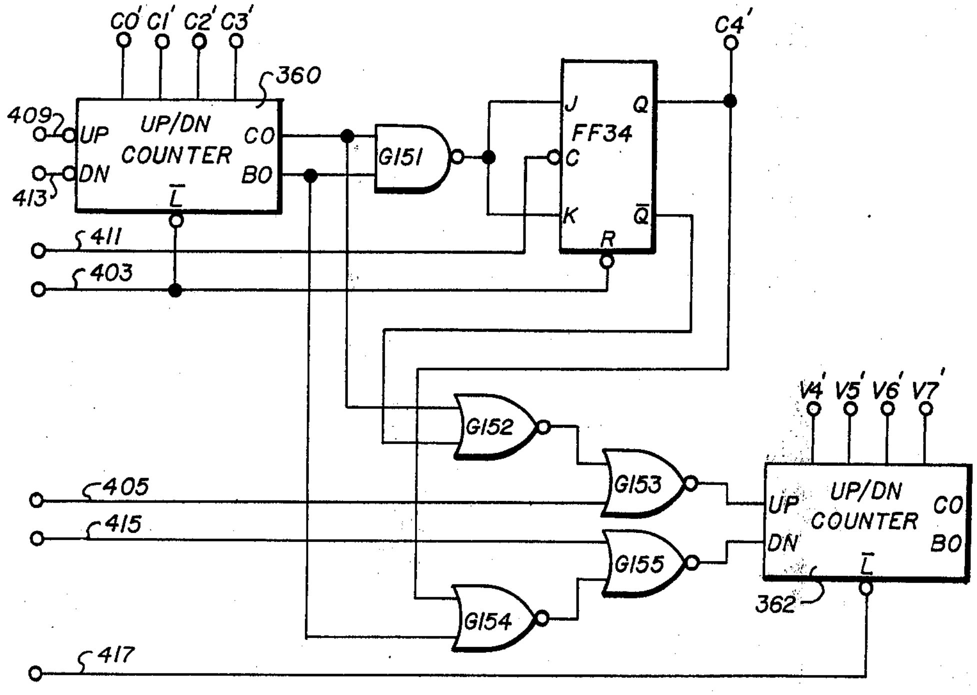
FIG. 10 is a block diagram of a write address register suitable for use in the character generator illustrated in FIG. 6.

FIG. 10 illustrates a preferred embodiment of a write address register suitable for use by the character generator. The write address register illustrated in FIG. 10 comprises: two up/down counters 360 and 362; a two-input NAND gate designated G151; four two-input NOR gates designated G152–G155; and, a JK flip-flop designated FF34. Conductor 409 is connected to the up input of the first up/down counter 360 and conductor 413 is connected to the down input of the first up/down counter 360. Conductor 403 is connected to the load input of the first up/down counter 360 and to the R input of FF34.

The first up/down counter 360 is four outputs designated C0′, C1′, C2′ and C3′ which, as will be better understood from the following description are used for comparison with the C0, C1, C2 and C3 signals generated by the sync generator.

The up overflow output (CO) and the down overflow output (BO) of the first up/down counter are, respectively, connected to the two inputs of G151. The output of G151 is connected to both the J and the K inputs of FF34. C0 is also connected to one input of G152 and B0 is also connected to one input of G154. Conductor 411 is connected to the C input of FF34. The Q output of FF34 is designated C4′ and is applied to the second input of G154. C4′, as with C0′–C3′, is utilized for comparison with the C4 signal generated by the sync generator. The $\overline{Q}$ output of FF34 is connected to the second input of G152. The output of G152 is connected to one input of G153 and the output of G154 is connected to one input of G155. Conductor 405 is connected to the second input of G153 and conductor 415 is connected to the second input of G155.

The output of G153 is connected to the up input of the second up/down counter 362 and the output of G155 is connected to the down input of the second up/down counter 362. Conductor 417 is connected to the load input of the second up/down counter 362. Four outputs of the second up/down counter are designated V4′, V5′, V6′ and V7′. These signals are utilized for comparison with the V4–V7 signals, respectively, generated by the sync generator.

In general, the write address register is controlled such that its outputs vary in accordance with the various space, line, etc., outputs of the function decoder 334. For example, when a forward space ($\overline{FS}$) zero pulse is generated by the function decoder, the zero on conductor 409 causes the first up/down counter to count up by one clock pulse. When a back space ($\overline{BS}$) occurs, a zero on conductor 413 causes the first up/down counter to count down by one clock pulse. Thus, the binary C0′–C4′ outputs which relate to character position move up or down by one count. When a carriage return signal occurs, a zero on conductor 403 resets both the up/down counter 360 and FF34. The up/down counter 360 is reset by loading it with a preset number. Thus, the entire line of characters as defined by C0′–C4′ is reset to zero. When forward line feed ($\overline{FLF}$) occurs, a zero on conductor 405 causes the second up/down counter to count up by an entire row of characters. Similarly, when back line feed ($\overline{BLF}$) occurs, a zero on conductor 415 causes the second up counter to count down by one row of characters. The other outputs of the function decoder cause their related actions in a similar manner.

Thus, in conclusion, the decoded outputs from the input register cause the generation of C0′–C4′ and V4′–V7′ signals, which should correspond to the timing signals from the sync generator at some particular time.

The signals C0'–C4' and V4'–V7' are then compared in the comparator 336 with the C0 –C4 signals and the V4 –V7 signals from the sync generator. If a comparison occurs, CMP is applied to the write timing circuit 342 and the cursor video generator 344.

The comparison is enabled when $\overline{ECP}$ drops to a zero state.

Figure 11:
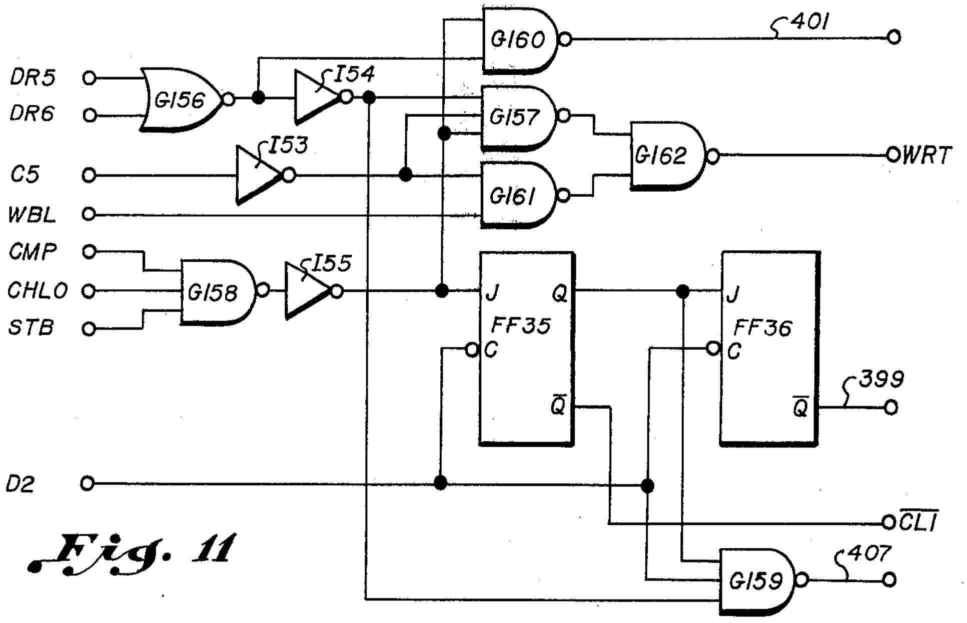
FIG. 11 is a block diagram of a write timing circuit suitable for use in the character generator illustrated in FIG. 6.

FIG. 11 is a block diagram of a write timing circuit suitable for use in the character generator illustrated in FIG. 6. The write timing circuit illustrated in FIG. 11 comprises: two JK flip-flops designated FF35 and FF36; a two-input NOR gate designated G156; three three-input NAND gates designated G157, G158 and G159; three two-input NAND gates designated G160, G161 and G162; and, three inverters designated I53, I54 and I55.

DR5 and DR6 are applied to the two inputs of G156 and detect the status of the outputs of the input data register. C5 is applied through I53 to one input of G157 and to one input of G161. WBL, from the write address register control, is applied to the second input of G161. CMP, from the comparator; CHLO, from the sync generator; and, STB, from the input data register are applied to the three inputs of G158. D2 is applied to the C inputs of FF35 and FF36 and to one input of G159.

The output of G156 is connected to one input of G160 and through I54 to the second input of G157 and to the second input of G159. The output of G158 is connected through I55 to the J input of FF35, the second input of G160 and the third input of G157. The outputs of G157 and G161 are connected to the two inputs of G162. The Q output of FF35 is connected to the J input of FF36 and to the third input of G159.

The output of G160 is connected to a conductor designated 401 which is connected to the function decoder for enable timing purposes. The output of G162 is designated WRT and is applied as described above to suitable logic to control writing by the character generator. The $\overline{Q}$ output of FF36 is connected to the conductor designated 399 and is applied to the input data register for clearing the storage register as heretofore described. The $\overline{Q}$ output of FF35 ($\overline{CL1}$) is also applied to the input data register to reset FF32. Thus, FF32 is rest before the storage register is enabled. The output of G159 is applied to the conductor designated 407 and is, thus, applied to the write address register control for enabling purposes, i.e., it enables the application of $\overline{FS}$ and $\overline{BS}$ to the up or down inputs of the first up/down counter of the write address register.

Turning now to a description of the operation of the write timing circuit illustrated in FIG. 11, assuming that a comparison exists between the outputs of the write address register (C '–C4', V4'–V7') and the other inputs to the comparator (C0–C4, V4–V7), CMP is in a one state. When a chosen character generator receives aa load signal, STB achieves a one state. Thereafter, CHL0 from the clock for the characcter generator illustrated in FIG. 2 reaches a one state when the first row of characters of the display is to occur. When all of these ones are applied to the input of G158, its output goes to a zero. Thus, the output of I55 places a one on the J input of FF35. Thereafter, the next D2 one pulse causes FF35 to be set. A subsequent D2 one pulse sets FF36. The first D2 pulse reset FF32 of the input data register, and the second D2 pulse clears the storage register of the input data register.

Assuming the signals on lines DR5 and DR6 are in appropriate one states, the output of G160 gates the output of I55 to the function decoder on conductor 401. This signal enables the function decoder. Assuming that WBL is in a zero state, the inverted C5 pulse causes the generation of a WRT instruction. WRT is generated by C5.WBL or CMP.CHLO.STB.DATA CHARACTER (output of I54).

Figure 12:
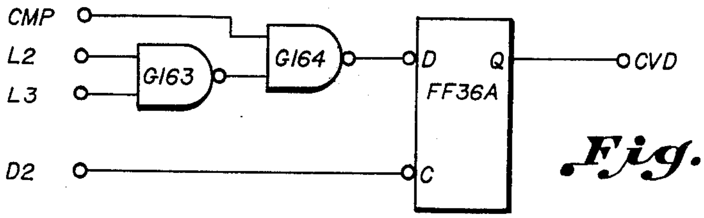
FIG. 12 is a block diagram of a cursor video generator suitable for use in the character generator illustrated in FIG. 6.

FIG. 12 is a block diagram of a cursor video generator suitable for use by the character generator and comprises: a D flip-flop designated FF36A; and, two two-input NAND gates designated G163 and G164. CMP is applied to one input of G164. L2 and C3, from the sync generator, are applied, respectively, to the two inputs of G163. The output of G163 is connected to the second input of G164. The output of G164 is connected to the D output of FF36A. D2, from the sync generator, is applied to the C input of the FF36A. The Q output of FF36A is a signal designated CVD to represent cursor video. Thus, the cursor video signal needed for a TV display is generated.

CHROMA GENERATOR

Figure 13:
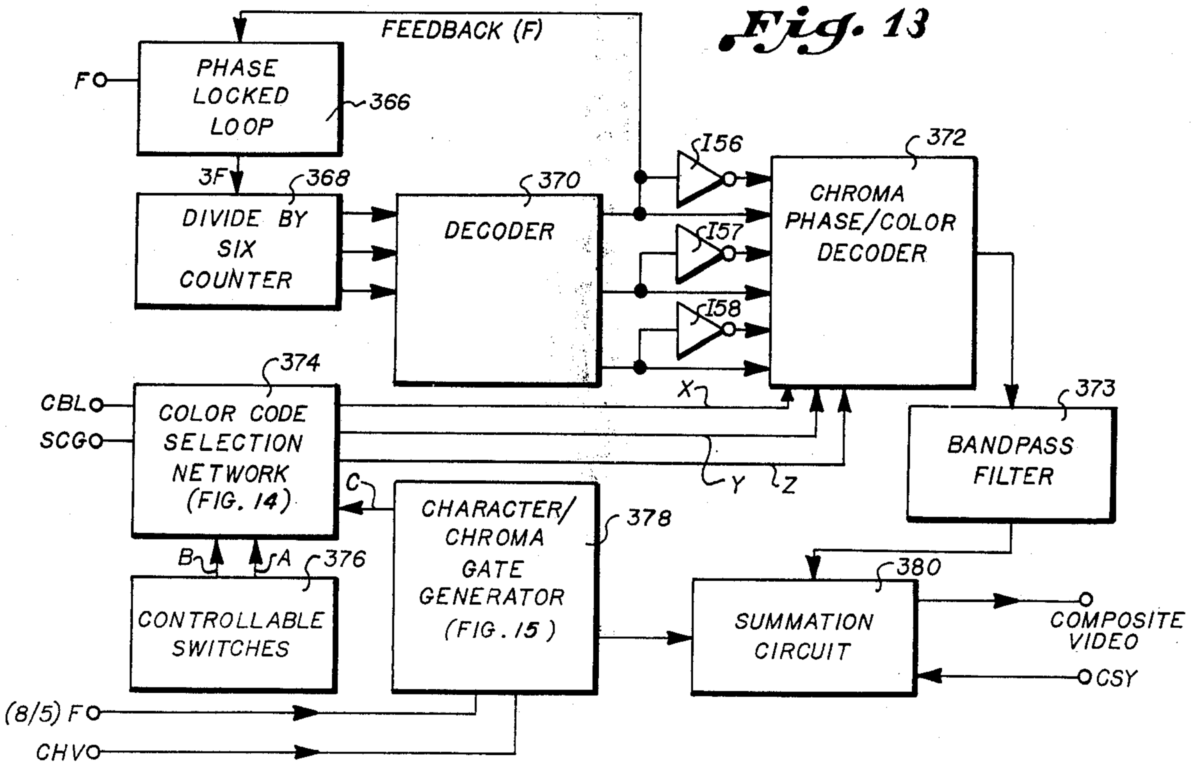
FIG. 13 is a block diagram of a chroma generator suitable for use in the embodiment of the invention illustrated in FIG. 1.

FIG. 13 is a block diagram illustrating a chroma generator suitable for use by the preferred embodiment of the invention illustrated in FIG. 1. The chroma generator illustrated in FIG. 13 comprises: a phase-locked loop 366; a divide-by-six counter 368; a decoder 370; a chroma phase/color decoder 372; a bandpass filter 373; a color code selection network 374; controllable switches 376; a character/chroma gate generator 378; and a summation circuit 380. In addition, the chroma generator illustrated in FIG. 54 includes three inverters designated I56, I57 and I58.

In operation, the phase-locked loop 366 receives the F signal generated by the sync generator and is designed such that it generates a signal at three times the frequency of F, i.e., 3F. 3F is applied to the divide-by-six counter 368, which generates three digital output signals related to the frequency of the input signal (3F). In this manner, the decoder receives a plurality of digital input signals. It decodes these signals into three signals having different phases but all being at the input frequency (F). In other words, the outputs from the decoder are three digital signals at the frequency F having 0°, 60° and 120° phase relationships. These signals are applied to the chroma phase/color decoder 372. In addition, one of these signals (0° phase) is used as a feedback signal to the phase-locked loop 366. Further, the three outputs from the decoder are inverted and the inverted outputs are also applied to the chroma phase/color decoder. Thus, the decoder receives six input signals, each of which is related by phase to a particular display color. The chroma phase/-color decoder, under the control of the color code selction network 374, selects one of these signals for application to its output conductor and, thus, to the summation circuit 380 via the bandpass filter which eliminates unwanted frequency components from the essentially digital output of the chroma phase/color decoder.

The color code selection network 374 is a presettable and controllable device which creates a binary code on conductors X, Y, and Z. This binary code controls color selection by means of the chroma phase/color decoder. The controllable switches 376 control a portion of the color code selection network via two conductors designated A and B. In addition, the character/chroma gate generator 378 also provides a control signal to the color code selection network via a conductor designated C. CBL (composite blanking), controls the gating of the output of the color code selection network, so that during the vertical blanking interval, the chroma phase/color decoder does not generate a color signal.

The input to the character/chroma gate generator is CHV (character video), and the output is essentially the same, i.e. also character video modified by a delay. This signal is also applied to the summation circuit 380. In addition, the summation circuit receives the composite sync signal (CSY) from the sync generator. Thus, the summation circuit receives all the information necessary to create a video signal. Hence, the output from the summation circuit is designated composite video. This signal is subsequently applied to a modulator which modulates the signal at the appropriate channel frequency. Thereafter, when the signal is received by the television viewer, his television set, which incorporates an appropriate demodulator, demodulates the signal to obtain the resultant video signal. The resultant video signal causes the appropriate alphanumeric character display to be created on the TV set tuned to the associated channel.

Figure 14:
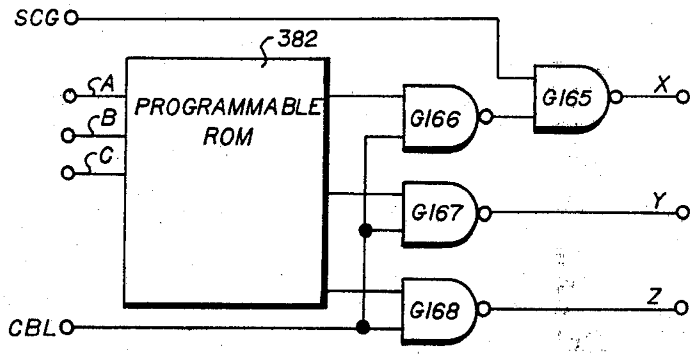
FIG. 14 is a block diagram of a color code selection network suitable for use in the chroma generator illustrated in FIG. 13; and, FIG. 15 is a block diagram of a character/chroma gate generator suitable for use in the chroma generator illustrated in FIG. 13.

FIG. 14 is a block diagram of a color code selection network suitable for use by the chroma generator illustrated in FIG. 13 and comprises a programmable read-only memory 382; and, four two-input NAND gates designated G165, G166, G167 and G168. Conductors A and B are connected to two of the program inputs of the programmable read-only memory 382. C is connected to the third input of the programmable read-only memory 382. In accordance with the signals (zero or one) on conductors A, B and C, the programmable read-only memory generates three digital output signals. These signals are applied to one input of each of the three gates G166, G167 and G168. The other input of each of the three gates is CBL. Thus, the blanking pulse controls whether or not the output from the three gates is a fixed one or is a controlled signal. The output from G166 is connected to one input of G165. SCG is applied to the second input of G165. The output of G165 is applied to a conductor designated X; the output of G167 is applied to a conductor designated Y; and the output of G168 is applied to a conductor designated Z. X, Y and Z are connected to the chroma phase/color decoder 372. The binary code on these conductors controls decoding by the chroma phase/color decoder, causing it to apply the signal on one of its six input conductors to its output conductor.

Figure 15:
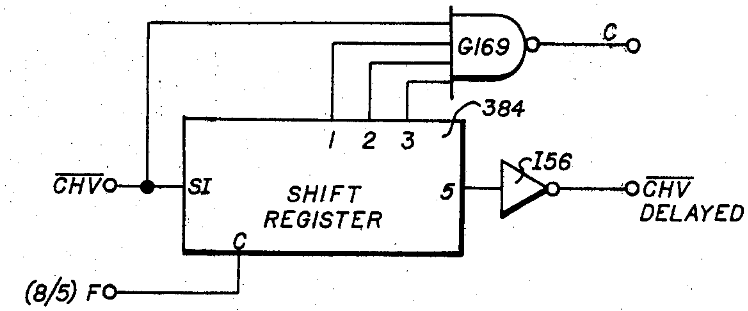

FIG. 15 is a block diagram illustrating a character/chroma gate generator suitable for use in the chroma generator illustrated in FIG. 13 and comprises a five-stage shift register 384; a four-input NAND gate designated G169; and, an inverter designated I56. $\overline{\text{CHV}}$, from the character generator, is applied to the serial input (SI) of the shift register 384. The (8/5)F signal from the sync generator is applied to the C input of the shift register. $\overline{\text{CHV}}$ and the outputs of the first three stages of the shift register (1, 2 and 3) are applied to the inputs of G169.

The output of G169 is applied to conductor C. Thus, CHV controls color selection. More specifically, in accordance with the A, B and C inputs to the color code selection network, the output of the chroma phase/color designates a color. A and B are fixed and C is variable. Normally, the output of G169 is a zero. A character, however, causes the output of G169 to achieve a one state. This one, through the color code selection network, changes the output of the chroma phase/color decoder so that a different color is generated. Thus, the background is in one color and the characters are in a different color. The output of the highest stage (5) of the shift register is applied through I56 to the summation circuit 380. Thus, the output of I56 remains $\overline{\text{CHV}}$, delayed by five dot times.

It will be appreciated by those skilled in the art and others that various changes can be made in the preferred embodiment herein described without departing from the spirit and scope of the invention. Hence, the invention can be practiced otherwise than is specifically described herein.

The embodiments of the invention in which an exclusive property or privilege is claimed are defined as follows:

We claim:

1. A character generation system suitable for creating a video signal adapted to create a color character display with a 263 TV line non-interlaced scan on the screen of a residential type TV receiver, comprising:

a sync generator suitable for generating a plurality of synchronizing signals adapted to create a 263 TV line non-interlaced scan, said synchronizing signals including a coded set of binary signals, said coded set of binary signals defining dots on a TV screen along a 263 TV line non-interlaced scan;

a character generator adapted to receive character nature signals from an external source and synchronizing signals from said sync generator, and generate a character video signal in accordance therewith suitable for application to a residential type TV receiver to create a character display along said 263 TV line non-interlaced scan; and, a chroma generator connected to said character generator so as to add chroma information to said character video signal whereby said character video signal is suitable for creating a color character display on the screen of a residential type TV receiver along said 263 TV line non-interlaced scan.

2. A character generation system as claimed in claim 1, wherein said sync generator comprises:

a frequency generator suitable for generating a dot frequency signal;

a timing chain connected to the output of said frequency generator suitable for dividing the dot frequency output of said frequency generator into a plurality of digital signals, said plurality of digital signals forming said coded set of binary signals;

a TV sync generator connected to said timing chain for generating predetermined synchronizing and timing signals including a composite sync signal; and, a clock for character generator connected to said timing for generating synchronizing and timing signals suitable for use by said character generator.

3. A character generation system as claimed in claim 2, wherein said character generator includes character generator circuitry suitable for receiving said character nature signals and storing all of said character nature signals related to at least one complete display page, said character generator circuitry also being suitable for converting said character nature signals into a character video signal synchronized by signals received from said sync generator.

4. A character generation system as claimed in claim 3 wherein said chroma generator is connected to said character generator circuitry to receive said character video signal and add chroma information to said signal, said chroma generator also being connected to said sync generator to receive said composite sync signal and add it to said character video signal whereby a composite video signal suitable for creating a color character display on the screen of a residential type TV receiver is created.

* * * * *